(12) United States Patent
Hayasaka et al.

(10) Patent No.: US 7,778,740 B2
(45) Date of Patent: Aug. 17, 2010

(54) POINT-SEQUENCE APPROXIMATION METHOD AND APPARATUS

(75) Inventors: Shoichi Hayasaka, Susono (JP); Masato Okuda, Novi, MI (US); Hisashi Satonaka, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 936 days.

(21) Appl. No.: 11/494,543

(22) Filed: Jul. 28, 2006

(65) Prior Publication Data
US 2007/0040835 A1  Feb. 22, 2007

(30) Foreign Application Priority Data
Aug. 17, 2005 (JP) .............................. 2005-236806

(51) Int. Cl.
*G06F 7/00* (2006.01)
(52) U.S. Cl. .......................................................... 701/1
(58) Field of Classification Search .................. 701/41, 701/1; 342/441–443
See application file for complete search history.

(56) References Cited

U.S. PATENT DOCUMENTS

| | | | | |
|---|---|---|---|---|
| 5,438,517 A | * | 8/1995 | Sennott et al. .............. | 701/213 |
| 5,633,946 A | * | 5/1997 | Lachinski et al. ........... | 382/103 |
| 6,674,434 B1 | | 1/2004 | Chojnacki et al. | |
| 7,552,008 B2 | * | 6/2009 | Newstrom et al. .......... | 701/207 |

FOREIGN PATENT DOCUMENTS

JP   2813059   8/1998

OTHER PUBLICATIONS

M. A. Fischler, et al., "Random Sample Consensus: A Paradigm for Model Fitting with Applications to Image Analysis and Automated Cartography", Communications of the Association for Computing Machinery,XP-001149167, vol. 24, No. 6, Jun. 1981, pp. 381-395.
Hirobumi Nagai, et al., "Screen Object Tracking for Projector-Based Mixed Reality", Technical Report of the Institute of Electronics, Information and Communication Engineers, MVE 2004-37, Oct. 2004, pp. 1-6.

\* cited by examiner

*Primary Examiner*—Yonel Beaulieu
(74) *Attorney, Agent, or Firm*—Oblon, Spivak, McClelland, Maier & Neustadt, L.L.P.

(57) ABSTRACT

A point-sequence approximation apparatus determines whether a proportion of a straight-line approximation region is high as compared to that of a curve approximation region. In addition, if it is determined that the proportion of the straight-line approximation region is high as compared to that of the curve approximation region, the point-sequence approximation apparatus repeatedly performs random setting of a candidate of an approximation straight line, and evaluation of approximation accuracy of the candidate of the approximation straight line based on distances between the candidate of the approximation straight line and the points constituting the point sequence. Moreover, the point-sequence approximation apparatus performs straight-line approximation by using the candidate of the approximation straight line with the best result of evaluation of the approximation accuracy as an approximation straight line.

15 Claims, 9 Drawing Sheets

POINT SEQUENCE

FIG. 8

FIG. 9

POINT-SEQUENCE APPROXIMATION METHOD AND APPARATUS

INCORPORATION BY REFERENCE

The disclosure of Japanese Patent Application No. 2005-236806 filed on Aug. 17, 2005 including the specification, drawings and abstract is incorporated herein by reference in its entirety.

BACKGROUND OF THE INVENTION

1. Field of the Invention

The present invention relates to a point-sequence approximation method of, and a point-sequence approximation apparatus for approximating a point sequence constituted of a plurality of points by a straight line and/or a curve.

2. Description of the Related Art

An approximation method of approximating position data having the form of a point sequence by a straight line and/or a curve is described in Japanese Patent No. JP-B2-2813059, for example. According to the above-mentioned approximation method, it is possible to smoothly connect two sets of approximated position data in adjacent approximation sections by selecting, from among candidates of the border point at which a straight line and a curve are connected, one that satisfies the following conditions as a border point: an angle formed between the straight line and the curve is equal to or greater than a first predetermined value; a segment ratio between the straight line and the curve is equal to or greater than a second predetermined value; and whole shape of the straight line and the curve has a convexity.

In the above-described approximation method, however, when a form of a point sequence is approximated by a straight line and/or a curve, great importance is placed on smoothly connecting the straight line and the curve in selecting the border point; accordingly, there is a possibility that the position of the approximation straight line is shifted toward the adjacent approximation curve, which can worsen approximation accuracy.

SUMMARY OF THE INVENTION

An object of the present invention is to provide a point-sequence approximation method and a point-sequence approximation apparatus with which approximation accuracy exhibited when a point sequence is approximated by a straight line and/or a curve is improved.

A first aspect of the present invention relates to a point-sequence approximation method of approximating a point sequence constituted of a plurality of points by a line. The point-sequence approximation method includes: determining whether a proportion of a straight-line approximation region is high as compared to that of a curve approximation region; if it is determined that the proportion of the straight-line approximation region is high as compared to that of the curve approximation region, repeatedly performing random setting of a candidate of an approximation straight line, and evaluation of approximation accuracy of the candidate of the approximation straight line based on distances between the candidate of the approximation straight line and the points constituting the point sequence; and performing straight-line approximation by using the candidate of the approximation straight line with the best result of evaluation of the approximation accuracy as an approximation straight line.

A second aspect of the present invention relates to a point-sequence approximation apparatus for approximating a point sequence constituted of a plurality of points by a line. The point-sequence approximation apparatus includes: a determination device for determining whether a proportion of a straight-line approximation region is high as compared to that of a curve approximation region; an evaluation device for, if it is determined that the proportion of the straight-line approximation region is high as compared to that of the curve approximation region, repeatedly performing random setting of a candidate of an approximation straight line, and evaluation of approximation accuracy of the candidate of the approximation straight line based on distances between the candidate of the approximation straight line and the points constituting the point sequence; and a straight-line approximation device for performing straight-line approximation by using the candidate of the approximation straight line with the best result of evaluation of the approximation accuracy as an approximation straight line.

According to the point-sequence approximation method and the point-sequence approximation apparatus described above, when it is determined that the straight-line approximation region is larger than the curve approximation region, from among candidates of the approximation straight line that have been randomly set, one with the best result of evaluation performed based on the distances between the set candidate of the approximation straight line and the points constituting the point sequence, is selected as the approximation straight line. If a candidate of the approximation straight line is set with points in the curve approximation region included, the gaps between the points within the straight-line approximation region and the candidate of the approximation straight line become large, which results in low approximation accuracy. According to the point-sequence approximation method and the point-sequence approximation apparatus described above, however, when it is determined that the straight-line approximation region is larger than the curve approximation region, the approximation straight line is selected. For this reason, it is possible to remove the influence of the points within the curve approximation region that are distant from the candidate of the approximation straight line, when the approximation straight line is selected. As a result, it is made possible to improve the approximation accuracy.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Detailed description will be given below of embodiments of the present invention with reference to the drawings. The same or corresponding portions are denoted by the same reference numerals in the drawings. In this description, point-sequence approximation apparatuses of the embodiments will be explained by taking, as an example, a case where the present invention is applied to parking assist systems for assisting the movement of a vehicle to a preset, desired parking position by automatic steering or by steering assist.

Figure 1:
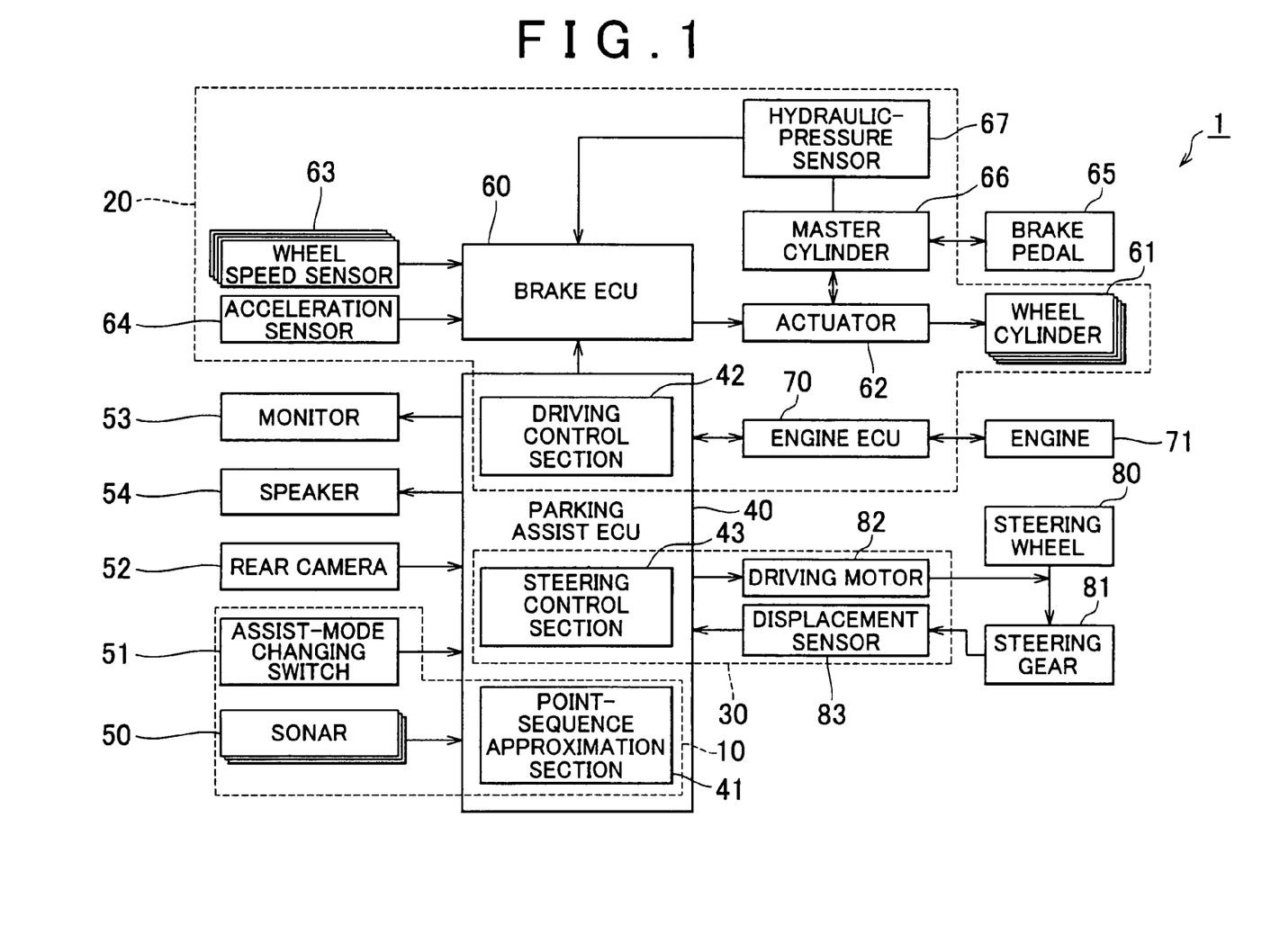
FIG. 1 is a block diagram showing a configuration of a parking assist system including a point-sequence approximation apparatus of a first embodiment according to the present invention.

First of all, description will be given of a configuration of a parking assist system 1 including a point-sequence approximation apparatus 10 of a first embodiment according to the present invention with reference to FIG. 1. FIG. 1 is a block diagram showing the configuration of the parking assist system 1 including the point-sequence approximation apparatus 10.

The parking assist system 1 assists the operation to park in a garage or the operation to perform parallel parking by using the image of a rear area of the vehicle captured by a rear camera 52, which image is displayed on a screen of a monitor 53, and the voice navigation using a speaker 54, and, in addition, by performing steering control by an automatic steering system 30. The parking assist system 1 includes the point-sequence approximation apparatus 10, a driving control system 20, and the automatic steering system 30, and is controlled by a parking assist ECU 40 that is an electronic control unit. The parking assist ECU 40 includes a CPU, a ROM, a RAM, an input signal circuit, an output signal circuit, a power supply circuit, and others. The parking assist ECU 40 has a point-sequence approximation section 41, a driving control section 42, and a steering control section 43 that control the point-sequence approximation apparatus 10, the driving control system 20, and the automatic steering system 30, respectively. The point-sequence approximation section 41, the driving control section 42, and the steering control section 43 may be individually realized by hardware in the parking assist ECU 40. Alternatively, these sections may be realized by software, while, concerning hardware, the same CPU, the same ROM, the same RAM and others are used.

The parking assist ECU 40 combines an image of a rear area of the vehicle, and an image of guiding lines created by performing calculation and making predictions based on positional information of other vehicles and the like to be supplied from the point-sequence approximation apparatus 10, and vehicle-state signals to be supplied from the driving control system 20 and the automatic steering system 30, and then displays the combined image on the monitor screen. In addition, the parking assist ECU 40 performs various controls for parking assist by outputting control signals to the automatic steering system 30 and the driving control system 20 according to the above-mentioned information and signals.

A sonar 50 for detecting other parked vehicles and the like, for example, is disposed in the vehicle in which the parking assist system 1 is installed. The output from the sonar 50, such as the distance from another vehicle or the like, is supplied to the parking assist ECU 40. The sonar 50 periodically transmits ultrasonic waves, and determines the presence of obstacles, such as other vehicles, based on the time from the transmission of the ultrasonic wave to reception of the reflected wave thereof. If there is an obstacle, the sonar 50 is used to determine the distance from the obstacle. A laser radar or the like may be used instead of the sonar 50.

An assist-mode changing switch 51 that is operated by a driver to make a selection between a parallel-parking assist mode and a parking-in-garage assist mode when parking assist is performed, and the rear camera 52 for capturing the image of a rear area of the vehicle are connected to the parking assist ECU 40. Thus, the output signal from the assist-mode changing switch 51 and the image signal acquired via the rear camera are supplied to the parking assist ECU 40. In addition, the monitor 53 for displaying information to the driver in the form of images, and the speaker 54 for providing information in the form of voice are connected to the parking assist ECU 40.

The point-sequence approximation apparatus 10 includes the point-sequence approximation section 41, the sonar 50 and the assist-mode changing switch 51 described above. If a proportion of a straight-line approximation region is high as compared to that of a curve approximation region, more specifically, if the parallel-parking assist mode is selected as a result of the operation of the assist-mode changing switch 51, the point sequence to be obtained from the output from the sonar 50, which point sequence mainly shows the position of a side of another vehicle, is approximated by a straight line, and the sequence of points that have been excluded from the straight-line approximation is approximated by a curve.

When the parallel-parking assist mode used in a case where the vehicle in which the parking assist system 1 is installed (herein also referred to as "the subject vehicle") is guided to a desired parking position after passing by the side of another parked vehicle, is selected, it is conceivable that the point sequence that is an output from the sonar 50 mainly shows the position of a side of a vehicle that has a substantially linear shape. In this case, the point-sequence approximation section 41 determines that the proportion of the straight-line approximation region is high as compared to that of the curve approximation region. In other words, the assist-mode changing switch 51 and the point-sequence approximation section 41 function as determining means.

When performing the straight-line approximation, the point-sequence approximation section 41 repeatedly performs random setting of a candidate of an approximation straight line, and evaluation of approximation accuracy of the candidate of the approximation straight line, using the distances between the candidate of the approximation straight line and the points constituting the point sequence, and then performs the straight-line approximation, using, as the approximation straight line, the candidate of the approximation straight line with the best result of the evaluation of approximation accuracy. In other words, the point-sequence approximation section 41 functions as evaluation means and straight-line approximation means.

In addition, the point-sequence approximation section 41 performs curve approximation of the sequence of points that have been excluded from the straight-line approximation, and selects, as a border, the point at which inclusion of the points in the straight-line approximation becomes inappropriate. In other words, the point-sequence approximation section 41 functions as curve approximation means and border detecting means.

In this embodiment, RANSAC (Random Sample Consensus) is used as an algorithm for approximating a point sequence by a straight line. On the other hand, as an algorithm for performing curve approximation of the sequence of points that are distant from the approximation straight line, that is, the sequence of points that are excluded from the straight-line approximation, the least squares method or the like can be used, for example.

RANSAC is an algorithm that first selects a required minimum number of data from among all the data at random, and then calculates parameters of the constraint. Next, the validity of the obtained values of the parameters is evaluated based on the remaining data. The above process is repeated sufficiently many times, and, thereafter, the values that gave the best result of the evaluation, and the data that support the values are retrieved. In this way, both correct parameters and correct data are simultaneously estimated.

In order for this algorithm to function effectively, there must be a sufficient number of correct data in all the data. For this reason, in this embodiment, a condition for using the RANSAC algorithm is that it is determined that the proportion of the straight-line approximation region is high as compared to that of a curve approximation region. More specifically, the condition is that the parallel-parking assist mode is selected as a result of the operation of the assist-mode changing switch 51.

The driving control system 20 includes the above-described driving control section 42, a braking system, and a driving system. The braking system is an electronically controlled braking (ECB) system that electronically controls the braking force to be applied to the wheels via a brake ECU 60. The braking system has a function of independently regulating the braking force to be applied to the wheels by regulating, via actuators 62, the hydraulic pressure supplied to wheel cylinders 61 of hydraulic brakes installed in the wheels.

The output signals from wheel speed sensors 63, which are provided for the wheels individually, for detecting the speed of the wheels, the output signal from an acceleration sensor 64 for detecting the acceleration of the vehicle, the output signals from a group of hydraulic-pressure sensors (not shown), which are disposed in the actuators 62, for detecting the hydraulic pressure in the actuators 62 and the hydraulic pressure supplied to the wheel cylinders 61, and the output signal from a master-cylinder hydraulic-pressure sensor 67 for detecting the hydraulic pressure in a master cylinder 66, which is connected between a brake pedal 65 and the actuators 62, are supplied to the brake ECU 60.

An engine ECU 70 controls an engine 71 constituting the driving system. The engine ECU 70 and the brake ECU 60 perform cooperative control by transmitting and receiving information to and from the driving control section 42.

The automatic steering system 30 includes: a driving motor 82 that also functions as a power steering apparatus, which driving motor is disposed between a steering wheel 80 and a steering gear 81; and a displacement sensor 83 for detecting the amount of displacement of the steering wheel 80. The steering control section 43 controls the driving of the driving motor 82, and receives the output signal from the displacement sensor 83.

Figure 2:
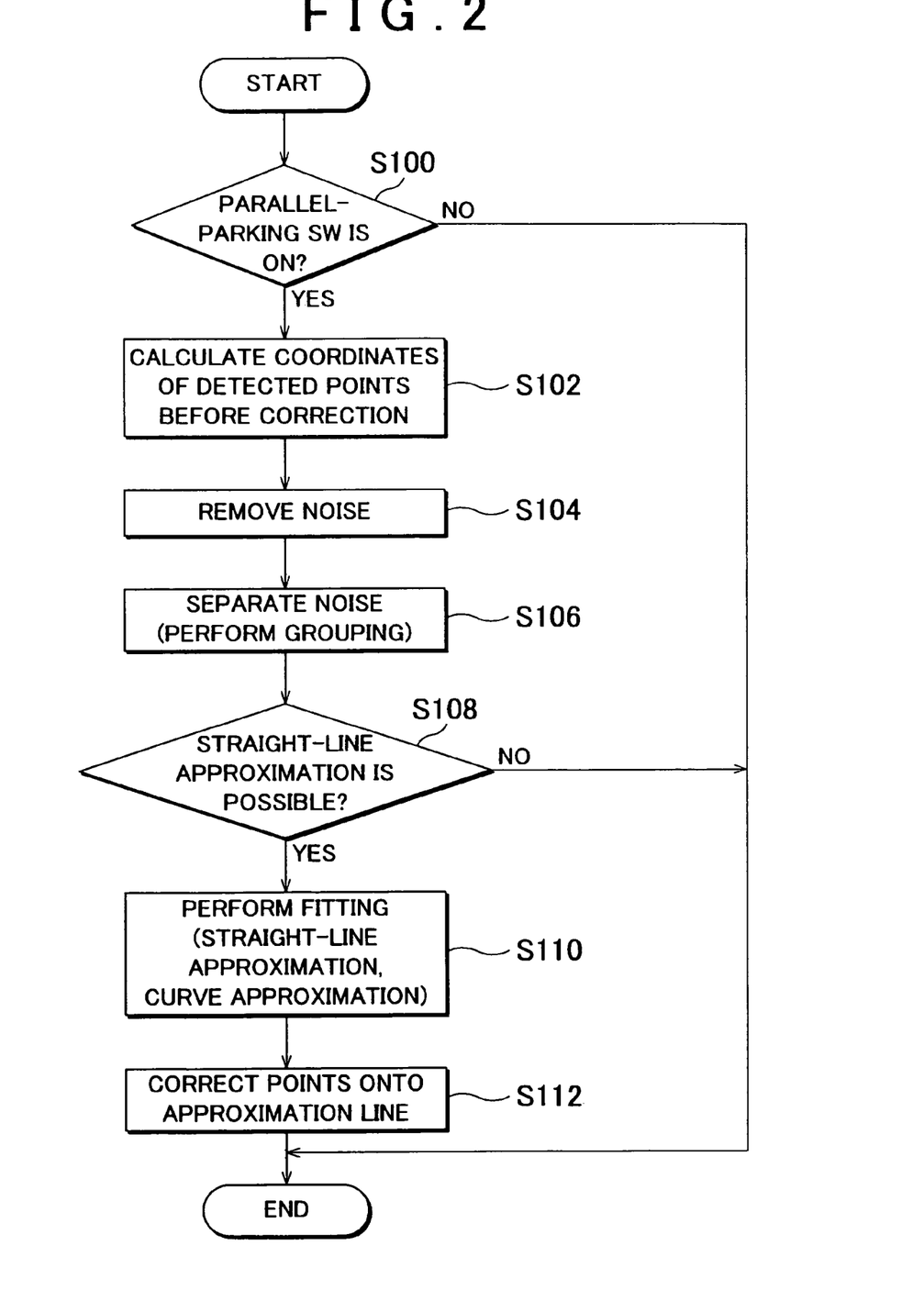
FIG. 2 is a flow chart showing a procedure of a point-sequence approximation process.

Next, with reference to FIG. 2, description will be given of an operation of the point-sequence approximation apparatus 10 carried out while the parking assist control is performed, and a point-sequence approximation method, by taking, as an example, a case where the parking assist is carried out by the parking assist system 1. FIG. 2 is a flow chart showing a procedure of a point-sequence approximation process carried out while the parking assist control is performed. This process is repeatedly performed from the time of turning on the power of the parking assist ECU 40 to the time of turning off the power thereof at predetermined intervals.

Figure 3:
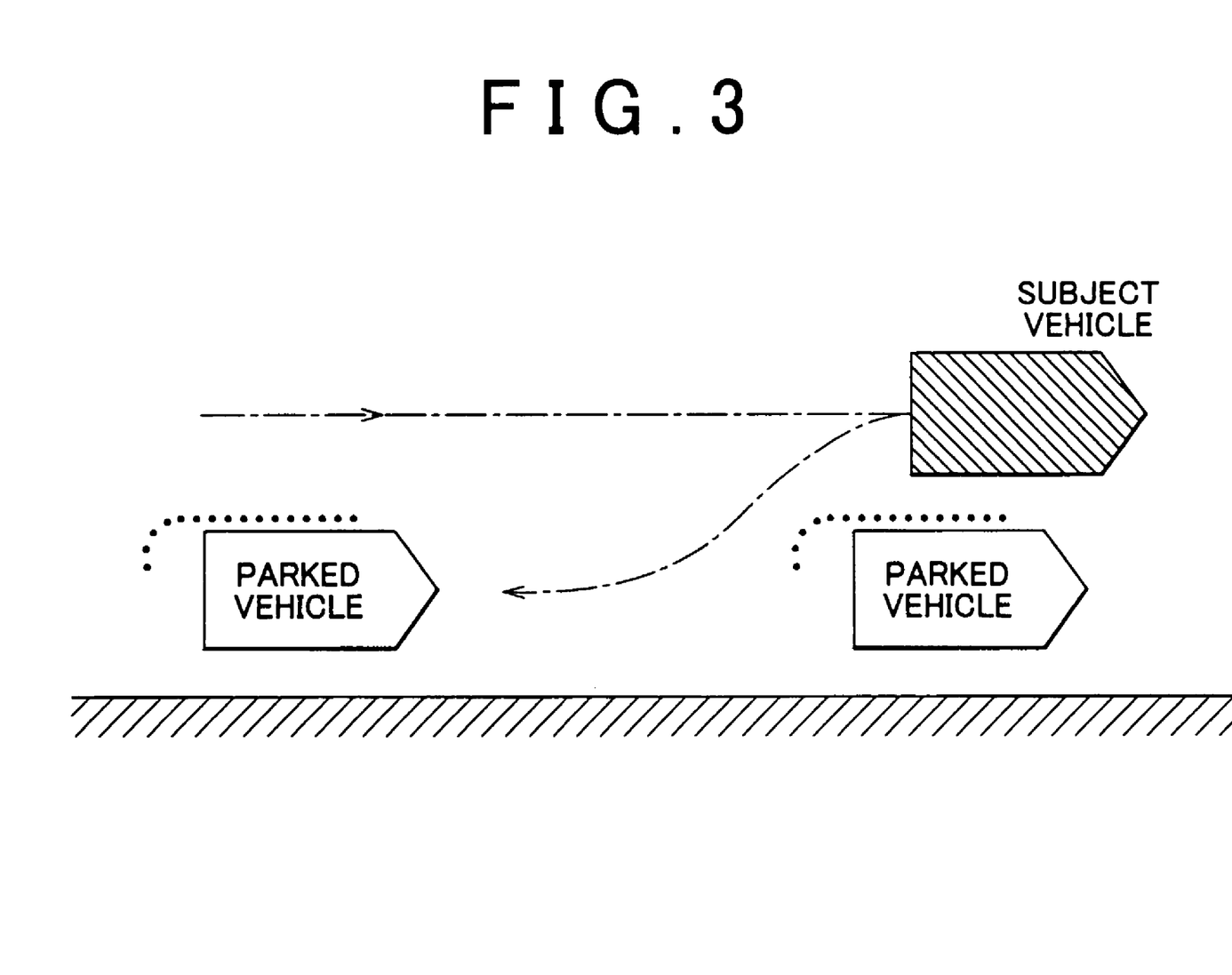
FIG. 3 is a diagram showing a travel path of a vehicle, in which the parking assist system is installed, taken when a parallel-parking assist is performed.

In step S100, it is determined whether the parallel-parking assist mode has been selected as a result of the operation of the assist-mode changing switch 51. If the parallel-parking assist mode is selected, it is conceivable that the point sequence that is an output from the sonar 50 shows the position of a side of another vehicle that has a substantially linear shape, because, in this case, the subject vehicle passes by the side of a parked vehicle, as shown in FIG. 3. Accordingly, it is determined that a proportion of a straight-line approximation region is high as compared to that of a curve approximation region, and the process proceeds to step S102. FIG. 3 is a diagram showing a travel path of the subject vehicle taken when a parallel-parking assist is performed.

Figure 4:
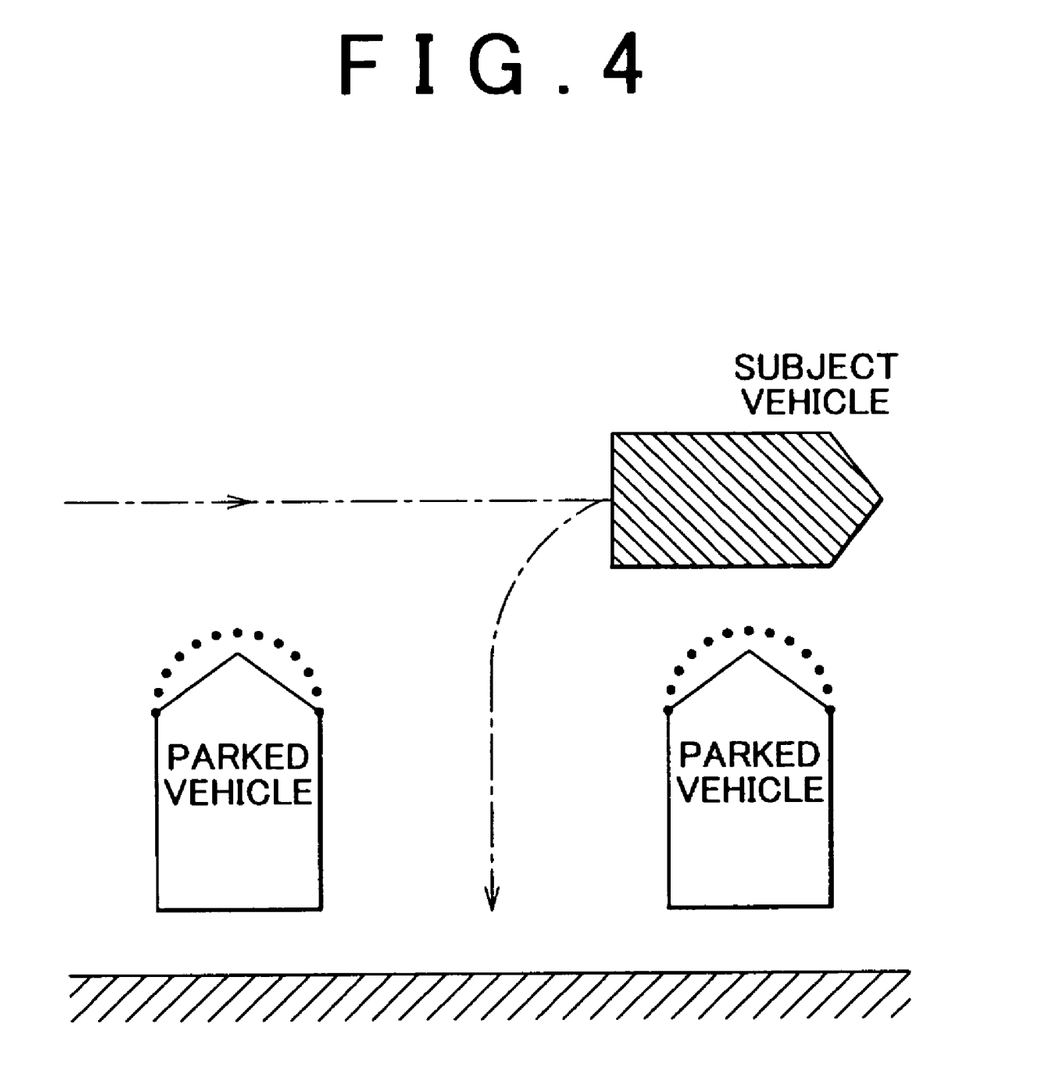
FIG. 4 is a diagram showing a travel path of the vehicle taken when a parking-in-garage assist is performed.

On the other hand, if the parallel-parking assist mode is not selected, that is, for example, if the parking-in-garage assist mode is selected, it is determined that the proportion of the straight-line approximation region in the point sequence that is an output from the sonar 50 is low, because, in this case, the subject vehicle passes the front or the rear of a parked vehicle, as shown in FIG. 4; accordingly, the process exits for the time being. FIG. 4 is a diagram showing a travel path of the subject vehicle taken when a parking-in-garage assist is performed.

Figure 5:
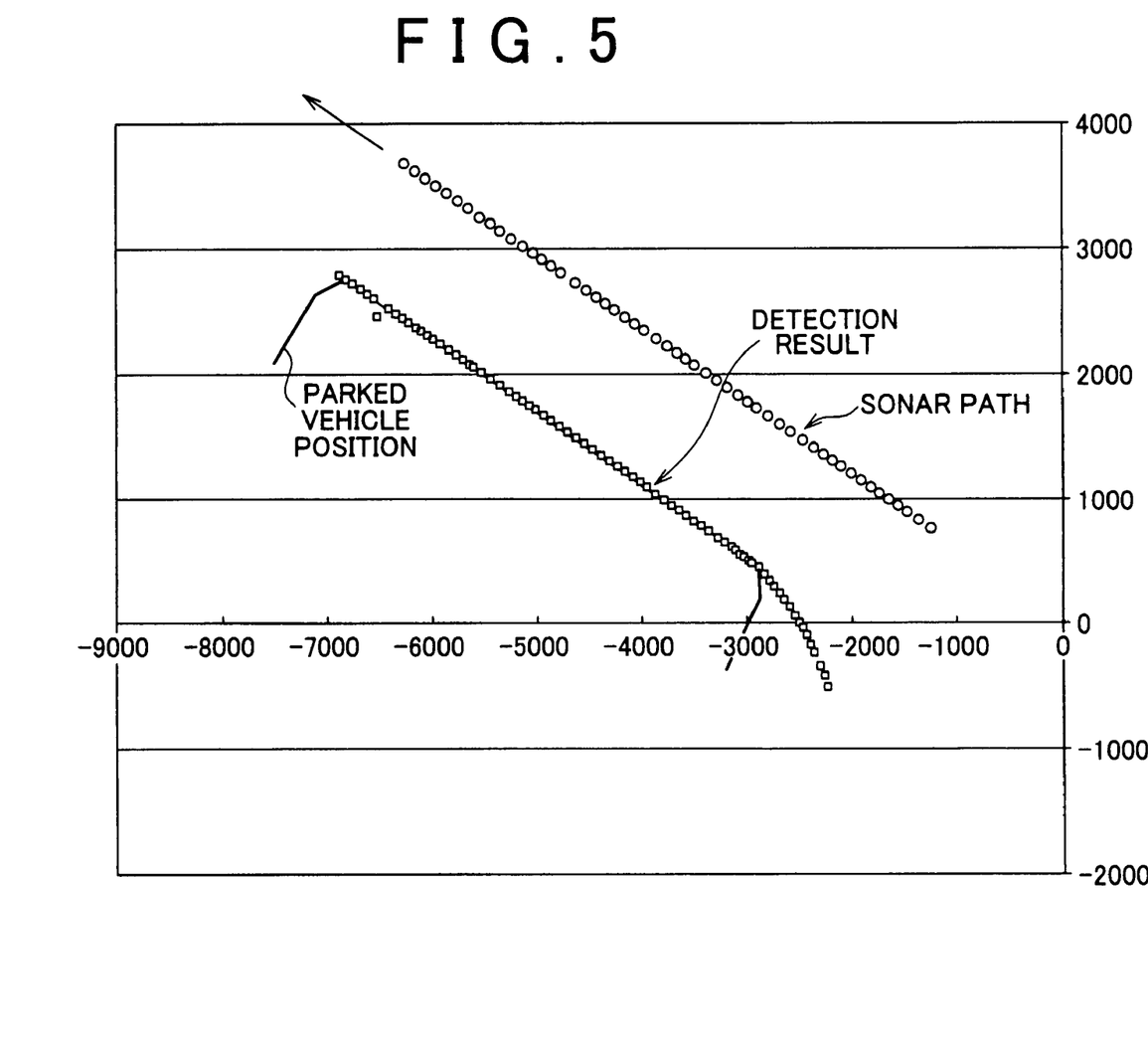
FIG. 5 is a diagram showing an example of a point sequence obtained from detection results outputted from a sonar.

In step S102, coordinates of each of the detected points are calculated from each detection result outputted from the sonar 50 (the distance between the subject vehicle and a parked vehicle). An example of the point sequence obtained from the detection results outputted from the sonar 50 is shown in FIG. 5. The vertical axis and the horizontal axis in FIG. 5 represent coordinates for identifying positions. In FIG. 5, the marks "○" show a path of the sonar 50, more specifically, a path taken when the vehicle in which the sonar 50 is installed travels in a direction from a position corresponding to a lower right portion of FIG. 5 toward a position corresponding to an upper left portion thereof. On the other hand, the marks "□" in FIG. 5 show the detection results (point sequence) outputted from the sonar 50, which are obtained while the sonar 50 moves along the path. With regard to this embodiment, the detection results (point sequence) are obtained by plotting the point that corresponds to the position distant, by the detected distance, from the subject vehicle in the direction perpendicular to the direction in which the subject vehicle travels. The solid line in FIG. 5 indicates the actual position of the parked vehicle.

In step S104, noise is removed from the detection results (point sequence) outputted from the sonar 50. Description will now be given of a method of removing noise with reference to FIG. 6. In removing noise, the coordinate data of n consecutive points (three points a', b' and c' in FIG. 6) are acquired, and it is determined whether each point is within a valid area that is set according to the moving distance of the subject vehicle from a reference point. The points that are not within the valid area are judged to be noise, and are therefore removed.

Figure 6:
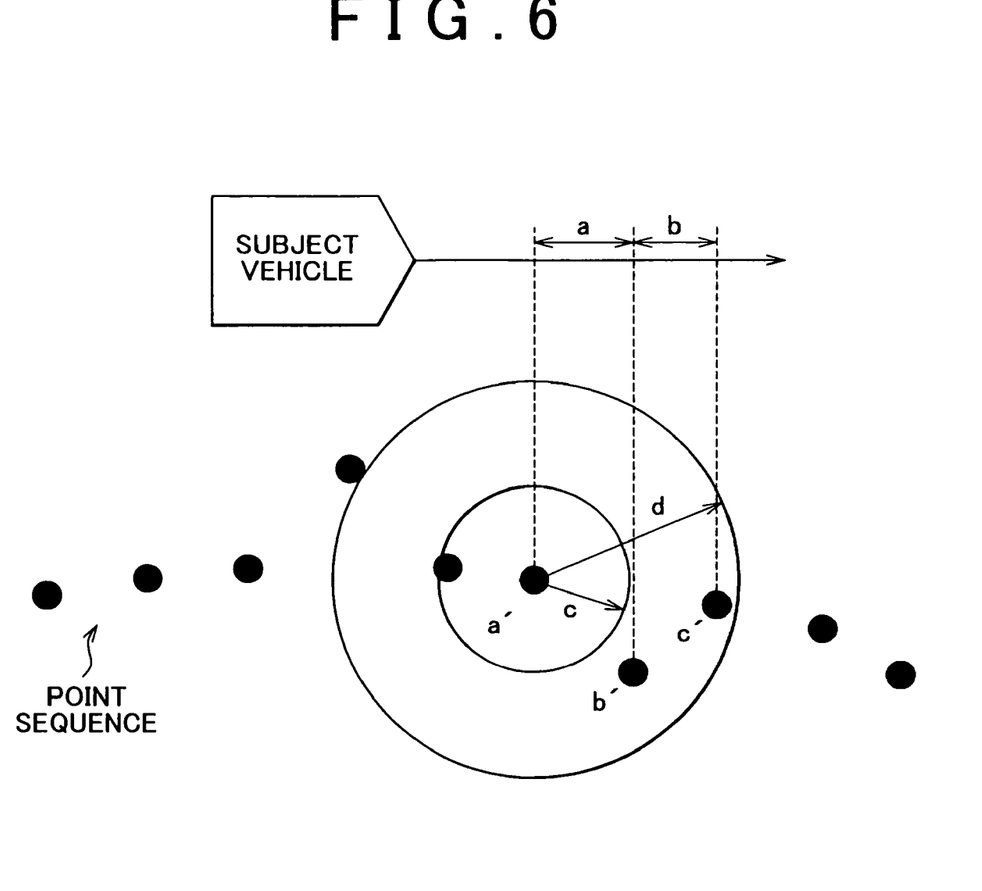
FIG. 6 is a diagram for explaining a method of removing noise.

More specifically, using the following equation (1), a valid area c with the reference point a' is calculated according to a moving distance a of the subject vehicle:

$$c = A \times a \qquad (1)$$

where A is a constant.

Subsequently, it is determined whether the point b' is within the valid area c with the reference point a'. If the point b' is not within the valid area c, the point b' is judged to be noise and is therefore removed. On the other hand, if the point b' is within the valid area c, the point b' is treated as a valid data.

Then, a valid area d corresponding to a moving distance (a+b) of the subject vehicle is calculated by using the following equation (2).

$$d = A \times (a+b) \quad (2)$$

Thereafter, it is determined whether the point c' is within the valid area d with the reference point a'. If the point c' is not within the valid area d, the point c' is judged to be noise, and is therefore removed. On the other hand, if the point c' is within the valid area d, the point c' is treated as a valid data.

The above-described process for removing noise is sequentially repeated for the other points constituting the point sequence, so that noise is removed from the detection results (point sequence) outputted from the sonar 50.

Figure 7:
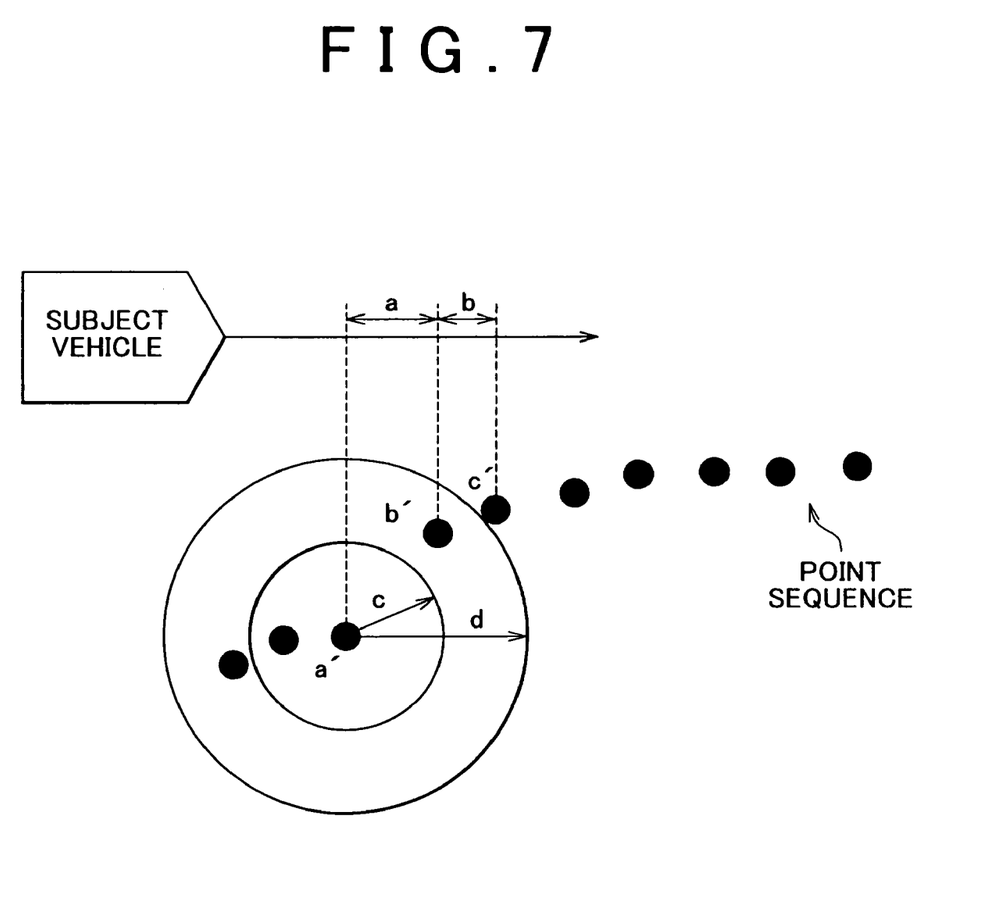
FIG. 7 is a diagram for explaining a grouping method.

Referring back to FIG. 2, in step S106, grouping of the detection results (point sequence) outputted from the sonar 50 is performed. Referring to FIG. 7, description will now be given of a method of grouping the point sequence. In a grouping process, the coordinate data of n consecutive points (three points a', b' and c' in FIG. 7) are acquired, and it is determined whether each point is within a valid area that is set according to the moving distance of the subject vehicle from a reference point. If there are consecutive points that are not within the valid area, the point sequence is divided at the reference point, and the sequences of points into which the original point sequence is divided are separated, and are treated as different groups.

More specifically, using the above equation (1), a valid area c with the reference point a' is calculated according to a moving distance a of the subject vehicle, and a valid area d corresponding to a moving distance (a+b) of the subject vehicle is calculated by using the above equation (2).

Thereafter, it is determined whether the point b' is within the valid area c with the reference point a', and it is determined whether the point c' is within the valid area d with the reference point a'. If the point b' is not within the valid area c, and the point c' is not within the valid area d, the point sequence is divided at the reference point a', and the sequences of points into which the original point sequence is divided are separated, and are treated as different groups. If any one of the points b' and c' is not within the valid area, the point that is not within the valid area is treated as noise.

The above-described grouping process is sequentially repeated for the other points constituting the point sequence to group the detection results (point sequence) outputted from the sonar 50.

Referring back to FIG. 2, in step S108, it is determined whether the point sequence that has been subjected to the noise removing process and the grouping process can be approximated by a straight line. For example, it is possible to determine whether the point sequence can be approximated by a straight line from the result of determining whether there are two points or more that constitute the acquired point sequence, the result of determining whether the proportion of the points from which the distances to a candidate of the approximation straight line are less than a predetermined threshold value to all the points is equal to or greater than 50%.

If it is judged that the point sequence can be approximated by a straight line, the process proceeds to step S110. On the other hand, if it is judged that the point sequence cannot be approximated by a straight line, the process exits for the time being.

In step S110, the point sequence is approximated by a straight line by using RANSAC, and the sequence of points that have been excluded from the straight-line approximation is approximated by a curve. In this way, fitting of the point sequence is performed. More specifically, straight-line approximation is first performed by carrying out the following steps (1) to (3).

(1) A candidate of the approximation straight line is set by using two points that are randomly selected from among the points constituting the point sequence.
(2) The distances between the set candidate of the approximation straight line and the points constituting the point sequence are calculated, and the number of such points that the obtained distances are within a predetermined threshold value is derived.
(3) The above steps (1) and (2) are repeatedly performed, so that the candidate of the approximation straight line for which there are the greatest number of such points that the distances are within the threshold value, that is, the candidate of the approximation straight line with the best result of the evaluation of approximation accuracy is determined as the approximation straight line.

On the other hand, for the sequence of points each being distant from the approximation straight line by the threshold value or more, that is, for the sequence of points that have been excluded from the straight-line approximation is approximated by a curve. As the algorithm for performing the curve approximation, the publicly-known, least squares method is used. In addition, the point at which inclusion of the points in the straight-line approximation becomes inappropriate is selected, and is determined as a border between the straight-line approximation region and the curve approximation region.

In step S112, the points constituting the point sequence are shifted (corrected) onto the approximation straight line or the approximation curve, which are determined in step S110. In this way, the position of another vehicle is determined.

Figure 8:
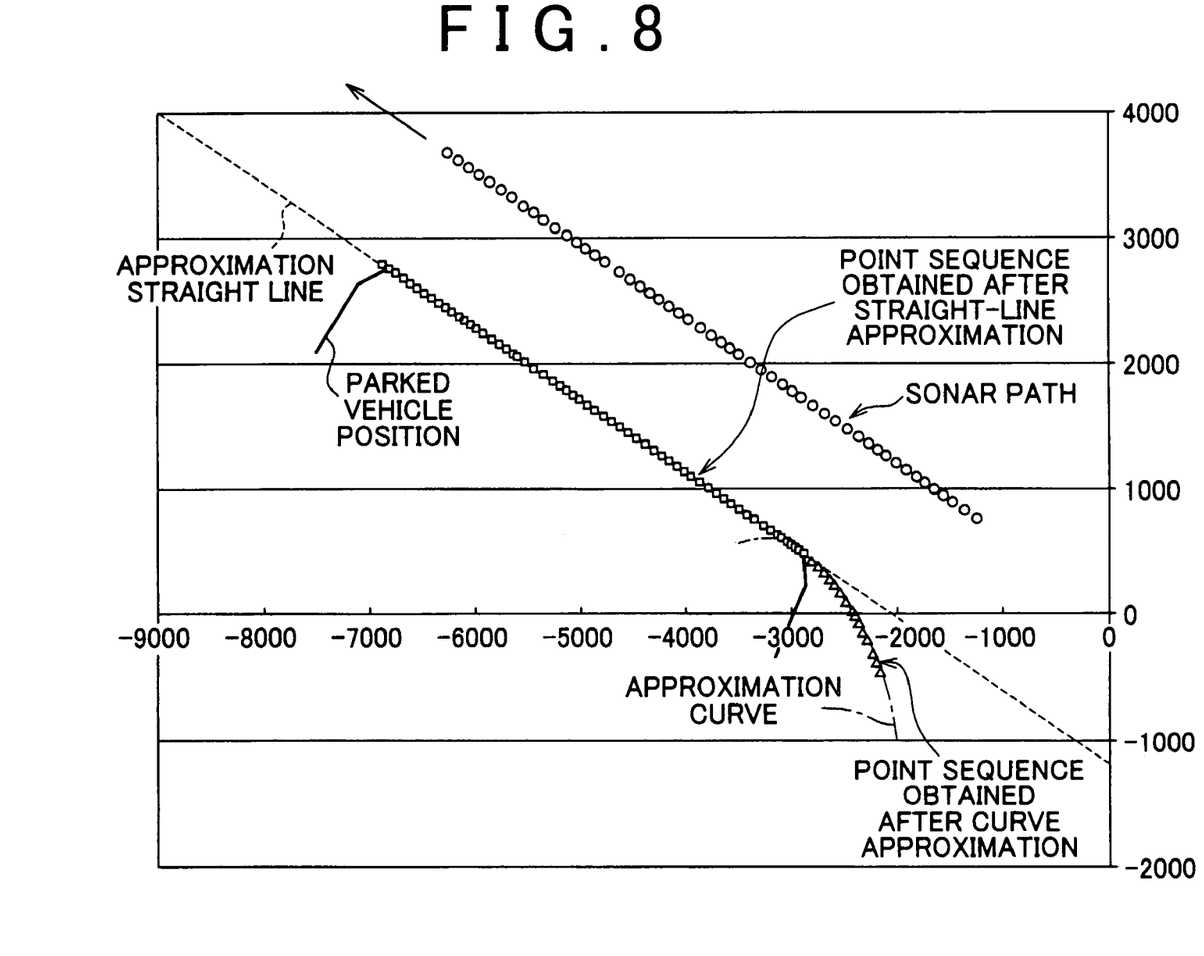
FIG. 8 is a diagram showing an example of a point sequence obtained after correction.

An example of a point sequence obtained after the correction is shown in FIG. 8. The vertical axis and the horizontal axis in FIG. 8 represent coordinates for identifying positions. In FIG. 8, the marks "○" show a path of the sonar 50, that is, a path taken when the vehicle in which the sonar 50 is installed travels in a direction from a position corresponding to a lower right portion of FIG. 8 to a position corresponding toward an upper left portion thereof. On the other hand, the marks "□" show the points (after correction) corresponding to a vehicle side portion that are approximated by a straight line. The marks "Δ" show the points (after correction) corresponding to a vehicle rear-end portion that are approximated by a curve. In FIG. 8, the broken line and the chain line represent the approximation straight line, and the approximation curve, respectively. The solid line indicates the actual position of the parked vehicle.

According to this embodiment, RANSAC is used as an algorithm for determining the approximation straight line, and, among the candidates of the approximation straight line that are randomly set, one with the best result of the evaluation performed using the distances between the candidate and the points constituting the point sequence is used as the approximation straight line. As a result, it is possible to obtain an optimal approximation straight line based on the sequence of points within the straight-line approximation region. Accordingly, it is made possible to improve the approximation accuracy of the straight-line approximation.

In order for RANSAC to function effectively, there must be a sufficient number of correct data in all the data. In this embodiment, the straight-line approximation using RANSAC is performed when the parallel-parking assist mode is selected as a result of the operation of the assist-mode changing switch 51. In general, a side face of a vehicle has a substantially linear shape. Thus, if the point sequence mainly shows the detected position of the side of the vehicle, the straight-line approximation region is larger than the curve approximation region; accordingly, an adequate approximation straight line can be obtained.

According to this embodiment, by detecting the sequence of points that have been excluded from the straight-line approximation based on the distances between the approximation straight line selected with high accuracy and the points, it is made possible to separate the sequence of points within the straight-line approximation region and the sequence of points within the curve approximation region with high accuracy. Accordingly, it is made possible to perform curve approximation based on the sequence of points within the curve approximation region that is appropriately separated.

In addition, by detecting the point at which inclusion of the points in the straight-line approximation becomes inappropriate, based on the distances between the approximation straight line selected with high accuracy and the points, it is possible to detect the border between the straight-line approximation region and the curve approximation region with high accuracy.

Figure 9:
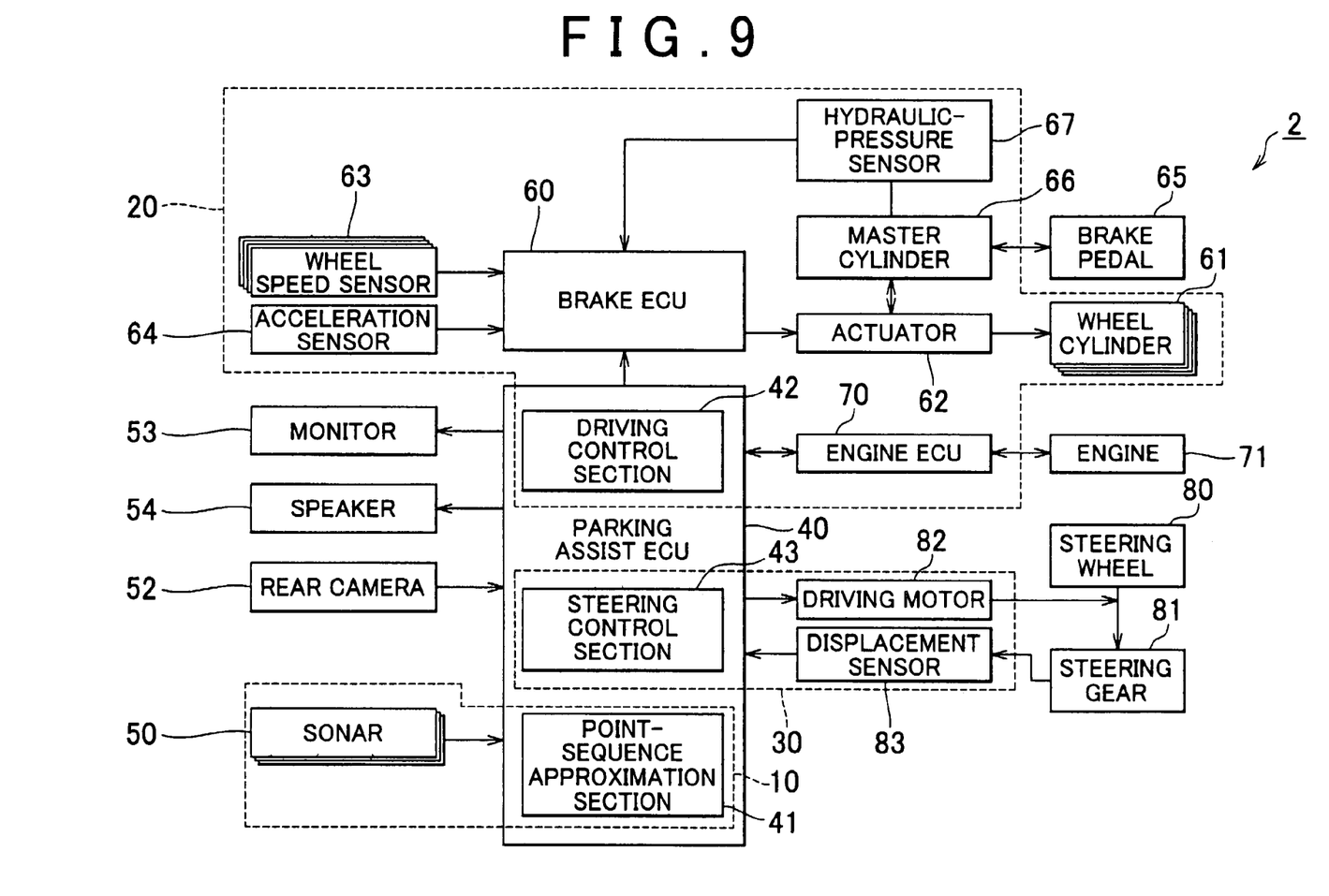
FIG. 9 is a block diagram showing a configuration of a parking assist system including a point-sequence approximation apparatus of a second embodiment according to the present invention.

Next, with reference to FIG. 9, description will be given of a configuration of a parking assist system 2 including a point-sequence approximation apparatus 11 of a second embodiment according to the present invention. FIG. 9 is a block diagram showing the configuration of the parking assist system 2 including the point-sequence approximation apparatus 11. In FIG. 9, the same or corresponding elements are denoted by the same reference numerals as those of the first embodiment.

The point-sequence approximation apparatus 11 of the second embodiment according to the present invention differs from the above-described apparatus of the first embodiment in that the assist-mode changing switch 51 that is operated by a driver to make a selection between the parallel-parking assist mode and the parking-in-garage assist mode is not included in the point-sequence approximation apparatus 11. The other features are the same as or similar to those of the first embodiment, and description thereof is omitted.

Description will be given of an operation of the point-sequence approximation apparatus 11 carried out while the parking assist control is performed, and a point-sequence approximation method, by taking, as an example, a case where the parking assist is carried out by the parking assist system 2.

The point-sequence approximation apparatus 10 of the first embodiment determines whether the proportion of the straight-line approximation region is high as compared to that of the curve approximation region after determining whether the parallel-parking assist mode has been selected as a result of the operation of the assist-mode changing switch 51 in step S100.

In contrast, the point-sequence approximation apparatus 11 of this embodiment automatically determines whether the proportion of the straight-line approximation region is high as compared to that of the curve approximation region, based on a score (an evaluation value) of RANSAC. More specifically, a candidate of the approximation straight line is randomly set, and the proportion of the points from which the distances to the candidate of the approximation straight line are less than a predetermined threshold value to all the points, that is, the score is calculated. The score is repeatedly calculated, and, if there is a candidate of the approximation straight line having a score equal to or greater than a predetermined value, it is determined that the proportion of the straight-line approximation region is high. On the other hand, if there is no candidate of the approximation straight line having a score equal to or greater than the predetermined value, it is determined that the proportion of the straight-line approximation region is low. The other operations (contents of the process) are the same as or similar to those of the first embodiment, and description thereof will be omitted.

According to this embodiment, it is made possible to automatically determine whether the proportion of the straight-line approximation region is high as compared to that of the curve approximation region, based on the score of RANSAC.

While embodiments of the present invention have been described, the present invention is not limited to the above-described embodiments, and various modifications can be made to the present invention. With regard to the above-described embodiments, the present invention is applied to parking assist systems. The present invention, however, can also be applied to systems other than the parking assist system, and can also be used alone.

What is claimed is:

1. A point-sequence approximation method of approximating a point sequence constituted of a plurality of points by a line, comprising:
   inputting point data from a sensor;
   determining with a processor whether a proportion of a straight-line approximation region of the point data is high as compared to that of a curve approximation region;
   when it is determined that the proportion of the straight-line approximation region is high as compared to that of the curve approximation region, repeatedly performing random setting of a candidate of an approximation straight line, and evaluating an approximation accuracy of the candidate of the approximation straight line based on distances between the candidate of the approximation straight line and the points constituting the point sequence; and
   performing with the processor straight-line approximation using the candidate of the approximation straight line with the best result of evaluation of the approximation accuracy as an approximation straight line.

2. The point-sequence approximation method according to claim 1, further comprising:
   detecting a sequence of points that have been excluded from the straight-line approximation using the approximation straight line, based on distances between the approximation straight line and the points constituting the point sequence, and then performing curve approximation of the sequence of points that have been excluded from the straight-line approximation.

3. The point-sequence approximation method according to claim 1, wherein,
   in the step of determining whether the proportion of the straight-line approximation region is high, when the point sequence shows a detected position of a side of a vehicle, it is determined that the proportion of the straight-line approximation region is high as compared to that of the curve approximation region.

4. The point-sequence approximation method according to claim 1, further comprising:
   detecting a border between the straight-line approximation region and the curve approximation region, based on the distances between the approximation straight line and the points constituting the point sequence.

5. A point-sequence approximation apparatus for approximating a point sequence constituted of a plurality of points by a line, comprising:
   an input device for inputting point data from a sensor;
   a determination device for determining whether a proportion of a straight-line approximation region of the point data is high as compared to that of a curve approximation region;

an evaluation device for, when it is determined that the proportion of the straight-line approximation region is high as compared to that of the curve approximation region, repeatedly performing random setting of a candidate of an approximation straight line, and evaluating approximation accuracy of the candidate of the approximation straight line based on distances between the candidate of the approximation straight line and the points constituting the point sequence; and a straight-line approximation device for performing straight-line approximation using the candidate of the approximation straight line with the best result of evaluation of the approximation accuracy as an approximation straight line.

6. The point-sequence approximation apparatus according to claim 5, further comprising:

a curve approximation device for detecting a sequence of points that have been excluded from the straight-line approximation using the approximation straight line, based on distances between the approximation straight line and the points constituting the point sequence, and then performing curve approximation of the sequence of points that have been excluded from the straight-line approximation.

7. The point-sequence approximation apparatus according to claim 5, wherein, when the point sequence shows a detected position of a side of a vehicle, the determination device determines that the proportion of the straight-line approximation region is high as compared to that of the curve approximation region.

8. The point-sequence approximation apparatus according to claim 5, further comprising:

a border detecting device for detecting a border between the straight-line approximation region and the curve approximation region, based on the distances between the approximation straight line and the points constituting the point sequence.

9. The point-sequence approximation method according to claim 1, wherein, in the step of determining whether a proportion of a straight-line approximation region is high as compared to that of a curve approximation region, a candidate of the approximation straight line is set by using two points that are randomly selected from among the points constituting the point sequence, distances between the set candidate of the approximation straight line and the points constituting the point sequence are calculated, a number of such points that the obtained distances are within a predetermined threshold value is derived, and when is determined that the proportion of the straight-line approximation region is high, provided that there is a candidate of the approximation straight line for which a proportion of such points that the distances from the candidate of the approximation straight line are within the predetermined threshold value to all the points constituting the point sequence is equal to or greater than a predetermined value.

10. The point-sequence approximation method according to claim 1, wherein, when the candidate of the approximation straight line is randomly set, two points that are randomly selected from among the points constituting the point sequence are used to set the candidate of the approximation straight line.

11. The point-sequence approximation method according to claim 1, wherein the evaluation of the approximation accuracy of the candidate of the approximation straight line is performed by calculating the distances between the set candidate of the approximation straight line and the points constituting the point sequence, and then deriving a number of such points that the obtained distances are within a predetermined threshold value.

12. The point-sequence approximation apparatus according to claim 5, wherein, the determination device sets a candidate of the approximation straight line by using two points that are randomly selected from among the points constituting the point sequence, calculates distances between the set candidate of the approximation straight line to the points constituting the point sequence, derives a number of such points that the obtained distances are within a predetermined threshold value, and determines that the proportion of the straight-line approximation region is high, provided that there is a candidate of the approximation straight line for which a proportion of such points that the distances from the candidate of the approximation straight line are within the predetermined threshold value to all the points constituting the point sequence is equal to or greater than a predetermined value.

13. The point-sequence approximation apparatus according to claim 5, wherein the evaluation device sets the candidate of the approximation straight line by using two points that are randomly selected from among the points constituting the point sequence.

14. The point-sequence approximation apparatus according to claim 5, wherein the evaluation device performs the evaluation of the approximation accuracy of the candidate of the approximation straight line by calculating the distances between the set candidate of the approximation straight line and the points constituting the point sequence, and then deriving a number of such points that the obtained distances are within a predetermined threshold value.

15. A point-sequence approximation apparatus for approximating a point sequence constituted of a plurality of points by a line, comprising:

input means for inputting point data from a sensor;

determination means for determining whether a proportion of a straight-line approximation region of the point data is high as compared to that of a curve approximation region;

evaluation means for, when it is determined that the proportion of the straight-line approximation region is high as compared to that of the curve approximation region, repeatedly performing random setting of a candidate of an approximation straight line, and evaluating approximation accuracy of the candidate of the approximation straight line based on distances between the candidate of the approximation straight line and the points constituting the point sequence; and straight-line approximation means for performing straight-line approximation using the candidate of the approximation straight line with the best result of evaluation of the approximation accuracy as an approximation straight line.

* * * * *